United States Patent [19]

Azgapetian, deceased

[11] Patent Number: 4,514,056
[45] Date of Patent: Apr. 30, 1985

[54] ACOUSTICALLY TUNED OPTICAL FILTER SYSTEM

[75] Inventor: Victor Azgapetian, deceased, late of Costa Mesa, Calif., by Alice M. Azgapetian, executrix

[73] Assignee: The United States of America as represented by the Secretary of the Air Force, Washington, D.C.

[21] Appl. No.: 439,493

[22] Filed: Nov. 5, 1982

[51] Int. Cl.³ .............................................. G02F 1/11
[52] U.S. Cl. .................................... 350/372; 350/404
[58] Field of Search ............... 350/372, 388, 404, 407, 350/358

[56] References Cited

U.S. PATENT DOCUMENTS

| | | | |
|---|---|---|---|
| 2,600,962 | 6/1952 | Billings | 350/372 |
| 3,562,414 | 2/1971 | Blum | 350/358 |
| 3,722,977 | 3/1973 | Sloane | 350/1 |
| 3,792,916 | 2/1974 | Sarna | 350/163 |
| 3,799,659 | 3/1974 | Roland et al. | 350/358 |
| 3,877,797 | 4/1975 | Thornton | 351/44 |
| 4,012,120 | 3/1977 | Kagiwada et al. | 350/358 |
| 4,070,101 | 1/1978 | Richards et al. | 350/312 |
| 4,197,008 | 4/1980 | Pinnow et al. | 350/388 |

OTHER PUBLICATIONS

Lotspeich et al., "Electo-Optic Tunable Filter", Optical Engineering, 11/12/81, pp. 830–836.
Solc, I, "Birefringent Chain Filters", Jr. Optical Soc. America, 6-1965, pp. 621–625.
Kahan, W., "Birefringent Laser Mirrors", App. Optics, 5-1969, pp. 985–992.
Chang et al., "Programmable Acousto-Optic Filter", Conf.: New Orleans, LA, USA, 26–28 Sep. 1979, Ultrasonic Symposium, pp. 40–45.
Pinnow et al., "An Electro-Optic Tunable Filter", App. Physics. Lett., 3-15-79, pp. 391–393.

Primary Examiner—William H. Punter
Attorney, Agent, or Firm—Donald J. Singer; Jacob N. Erlich

[57] ABSTRACT

Two crystals, made of acousto-optical material and having their respective extraordinary axes at a predetermined angle to each other, are acoustically excited; and, in combination with a polarizer and an analyzer, the acoustically excited crystals permit the complete transmission or rejection of a preselected narrow band of polarized light in the visible/infrared wavelength region.

3 Claims, 1 Drawing Figure

LEGEND:
- ⋆⋆→ UNPOLARIZED LIGHT
- ↕↕→ VERTICALLY POLARIZED LIGHT
- ↔↔→ HORIZONTALLY POLARIZED LIGHT

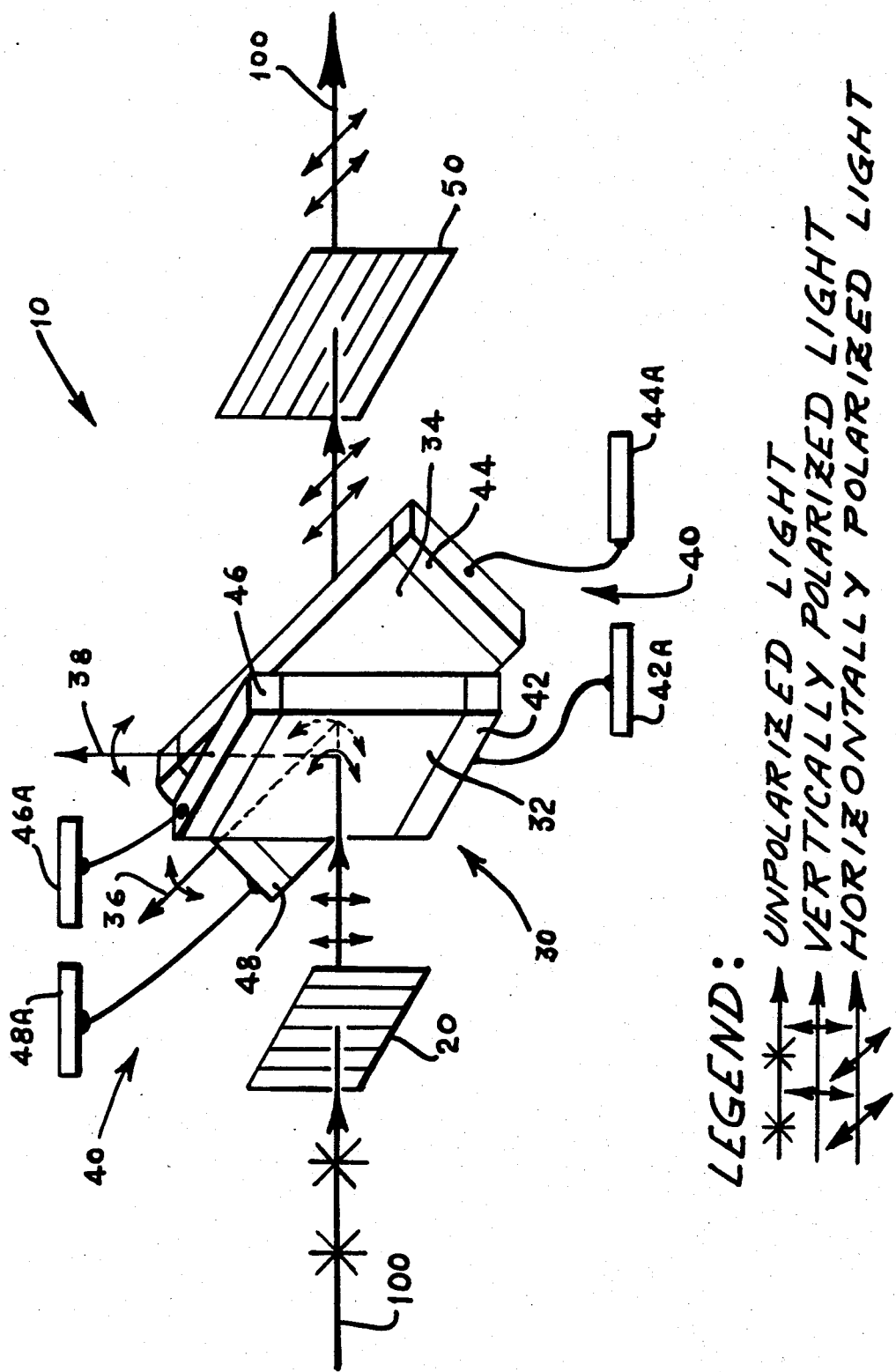

ACOUSTICALLY TUNED OPTICAL FILTER SYSTEM

STATEMENT OF GOVERNMENT INTEREST

The invention described herein may be manufactured and used by or for the Government for governmental purposes without the payment of any royalty thereon.

BACKGROUND OF THE INVENTION

This invention relates to optical filters and more particularly to acoustically tuned optical filters.

Optical filters that pass or reject a band of wavelengths around a preselected central wavelength are used in some modern optical systems. These prior art optical filters allow this central wavelength, and pertinent characteristics of the filter, to be changed electrically.

In a typical prior art optical filter of the type referred to hereinabove, a single crystal having birefringent characteristics is used and is electrically excited by suitable means. The excited crystal, when illuminated by light which is polarized parallel to the crystal's extraordinary axis, shifts a fraction of the light energy (in a narrow wavelength band) to the ordinary axis. Light outside of that wavelength band is unaffected. Such a typical prior art optical filter can shift perhaps 70 percent or more of the light energy, but a 100 percent shift has not been attainable, although desirable (and in fact necessary) in some situations. Stated another way, a 90 degree rotation of the plane of polarization cannot be made. As a result, the in-band and the out-of-band light have polarization planes less than 90 degrees apart, so that the rejection or the transmission is incomplete with these prior art optical filters.

SUMMARY OF THE INVENTION

The instant invention eliminates the aforesaid prior art problem, i.e., less than complete transmission or rejection of the impinging light energy. It does so by substituting two (or more) crystals for the prior art single crystal, with the crystals being made of acousto-optical material (i.e., material, such as calcite or quartz, in which the optical characteristics are changed by the application of an acoustical field, and which is birefringent), and with these acousto-optical material crystals being rotatable and positioned such that their respective extraordinary axes are at a preselected angle to each other (or are at appropriate preselected angles to each other, if more than two such crystals are used). Thus, by allowing each acousto-optical crystal to provide a portion of the rotation, the desired complete 90 degree rotation is easily achieved, with resultant complete transmission or rejection, in or out-of-band, of the impinging polarized light.

Accordingly, it is an object of the instant invention to provide a uniquely structured acoustically tuned optical filter system which will permit the complete transmission or rejection of polarized electromagnetic radiation in a preselected portion of the visible/infrared light wavelength region.

It is another object of this invention to provide such a filter system in which two (or more) acoustically excited crystals are used, rather than the single electrically excited crystal used in the prior art.

It is still another object of the instant invention to provide such an optical filter system in which the optical bandwidth concerned (i.e., within the visible/infrared light wavelengths) can be smoothly, continuously, and selectively varied.

It is a further object of this invention to permit the full (i.e., complete) transmission or rejection of any preselected portion of the visible/infrared light wavelength region with less total power input, less dissipation of heat occuring, and therefore less heat to be removed from the system, than when one of the prior art single crystal, partially transmitting or partially rejecting, optical filters is used.

It is a still further object of the instant invention to permit the alteration of the inventive optical filter system as a whole, simply by varying the individual characteristics of the acoustic power which is supplied to each crystal.

These objects of the instant invention, as well as other objects related thereto (such as ease of operation, and reliability in use), will become readily apparent after a consideration of the description of the instant invention, together with reference to the contents of the drawing.

DESCRIPTION OF THE DRAWING

The drawing is a side view, in simplified p and schematic form, and partially in perspective, of a preferred embodiment of the instant invention while in use in a band pass mode.

DESCRIPTION OF THE PREFERRED EMBODIMENT

With reference to the drawing, therein is shown, in simplified form, a preferred embodiment 10 of the instant invention, an acoustically tuned (i.e., tuneable) optical filter system for use in transmitting or rejecting electromagnetic radiation in the visible/infrared light wavelength region.

In its most basic and generic structural form, the preferred embodiment 10 of the instant invention comprises: a polarizer 20 which is disposed in optical alignment with electromagnetic radiation in the visible/infrared light wavelength region (such as light beam 100), and upon which this unpolarized radiation 100 impinges, and through which the radiation 100 is transmitted in a polarized condition; an acoustically tuned (i.e., tuneable) optical filter assembly (generally designated 30) which is disposed in optical alignment with the polarizer 20, and which includes a plurality of crystals (such as 32 and 34) that are made of acousto-optical material (such as calcite or quartz), and which further includes means (such as is generally designed 40) for acoustically exciting each crystal of the plurality of crystals (such as 32 and 34); and an analyzer 50 in optical alignment with the acoustically tuned filter assembly 30.

More specifically, the crystals (such as 32 and 34) of the acoustically tuned optical filter assembly 30 are rotatable and are in parallel spaced relationship. Each crystal has its front surface (i.e., its face) in perpendicular relationship to the transmitted polarized radiation 100. In addition, the extraordinary axis of each crystal (such as extraordinary axis 36 of crystal 32, and extraordinary axis 38 of crystal 34) is perpendicular to the transmitted radiation 100. As a result, the extraordinary axes (such as 36 and 38) of the crystals (such as 32 and 34) can be continuously and selectively rotated angularly, and thereby variably, with respect to each other, by rotating the appropriate crystal(s).

The means 40 for acoustically exciting each crystal 32 and 34 of the plurality of crystals includes a plurality of acoustic generators (such as 42 and 44), with at least one generator for each crystal (such as generator 42 for crystal 32, and generator 44 for crystal 34), and with each generator operably associated (i.e., acoustically coupled, such as in direct contact) with its respective crystal. However, as a matter of preference and not of limitation, a pair of acoustic generators is used with each crystal (such as acoustic generators 42 and 46 with crystal 32, and acoustic generators 44 and 48 with crystal 34), with each generator of each pair of generators separated from each other, and positioned in abutting contact respectively with the mutually opposed side edges of their respective crystal. For example, generator 42 is in abutting contact with one side edge of crystal 32, and generator 46 is in abutting contact with the opposite side edge of crystal 32, as can be seen readily in the drawing. Also as a matter of preference, each of the acoustic generators is in electrical connection with, and is driven by, its own source of alternating current electricity, e.g., a.c. electricity sources 42A, 44A, 46A and 48A are connected to and drive, respectively, acoustic generators 42, 44, 46 and 48.

MANNER OF USE AND OPERATION OF THE PREFERRED EMBODIMENT

The manner of operation, and of use, of the preferred embodiment 10 of the instant invention can be easily ascertained by any person of ordinary skill in the art from the foregoing description, coupled with reference to the contents of the drawing.

For others, the following oversimplified explanation is given with regard to the preferred embodiment 10 of the inventive acoustically tuned optical filter system shown in the drawing. It is here to be remembered that the preferred embodiment 10 of the instant invention, as shown in the drawing, is depicted while in use in a "band pass mode", i.e., the polarizer 20, the optical filter assembly 30, and the analyzer 50 are positioned (are in a "mode") to permit the transmission (the "pass") of a certain portion (the "band") of the light beam 100. To permit only that "band" to "pass", the beam 100 is made to impinge upon polarizer 20 which is a device that permits only polarized light (i.e., light travelling in one plane perpendicular to the direction of the light beam) to pass. Then, the crystals 32 and 34 are excited by acoustic ("sound") waves which are produced with the use of means 40, in which the pulsating electricity from the sources 42A, 44A, 46A and 48A is converted, respectively, by acoustic generators 42, 44, 46 and 48 into the sound waves which excite crystals 32 and 34. The excited crystals are positioned, or are rotated into a predetermined position, so that only the desired "band" will pass. The passed "band", however, is now polarized in a different plane, e.g., horizontally, so that use of a properly positioned analyzer 50 (a device which only "passes" plane polarized light) is necessary. The light 100 which is transmitted by the analyzer 50 is the complete "band" which is desired to be "passed", and the task has been completed. The functional difference between this acoustically tuned optical filter system, and the optical filters systems used previously for the same purpose, is that this system permits the passage of the entire desired "band", whereas the other only permitted the passage of a portion of the desired "band".

CONCLUSION

It is abundantly celar from all of the foregoing, and from the contents of the drawing, that the stated objects of the instant invention, as well as other objects related thereto, have been achieved.

It is to be noted that, although there have been described and shown the fundamental and unique features of the instant invention, as applied to a preferred embodiment 10, nevertheless various other embodiments, variations, adaptations, substitutions, additions, and the like may occur to and can be made by those of ordinary skill in the art. For example: (a) the number of crystals used in the optical filter assembly 30 can be increased to more than two; (b) the means 40 for acoustically exciting the crystals 32 and 34 need not include sources of electrical energy (such as 42A, 44A, 46A, and 48A), but instead could include sources of mechanical energy, or other appropriate sources of energy, to drive the acoustic generators 42, 44, 46; and (c) the means 40 could comprise only a source of acoustic power, such as siren operating at an appropriate frequency and pulsating.

What is claimed is:

1. An acoustically tuned optical filter system for use with electromagnetic radiation in the visible/infrared light wavelength region, said optical filter system comprising:
    a. a polarizer in optical alignment with said radiation, whereby said radiation impinges upon and is transmitted by said polarizer as polarized light;
    b. an acoustically tuned optical filter assembly disposed in optical alignment with said polarizer, wherein this assembly includes:
        (1) a plurality of rotatable crystals made of acousto-optical material, with each crystal of said plurality being in parallel spaced relationship with its adjacent crystal, and with each crystal having its front surface and its extraordinary axis in perpendicular relationship to said transmitted radiation, whereby said crystals can be rotated such that said extraordinary axes of said crystals can be selectively rotated angularly, and thereby variably, with respect to each other, and wherein each crystal of said plurality of crystals has two mutually opposed side edges; and
        (2) means, operably associated with said plurality of crystals, for acoustically exciting each of said plurality of crystals, said means for acoustically exciting each crystal includes a different pair of acoustic generators operably associated with each crystal, with one generator of said pair of generators operably associated with one of said two edges of its crystal, and with the other generator of said pair of generators operably associated with the other edge of said two edges of its crystal; and
    c. an analyzer in optical alignment with said acoustically tuned optical filter assembly.

2. An acoustically tuned optical filter system, as set forth in claim 1, wherein said means for acoustically exciting each crystal of said plurality of crytals further includes a different pair of sources of alternating current electricity for each pair of acoustic generators, with one source of alternating current electricity of said pair of sources of alternating current electricity in electrical connection with one of said pair of acoustic generators, and with the other source of alternating current electricity of said pair of sources of alternating current electricity in electrical connection with the other one of said pair of acoustic generators.

3. An acoustically tuned optical filter system, as set forth in claim 2, wherein said plurality of crystals consists of two such crystals.

* * * * *